United States Patent [19]

Bluestein

[11] 4,138,387

[45] Feb. 6, 1979

[54] POLY(OLEFINIC MONOMER) FILLED-POLY(ORGANOSILOXANE) COMPOSITIONS

[75] Inventor: Ben A. Bluestein, Schenectady, N.Y.

[73] Assignee: General Electric Company, Waterford, N.Y.

[21] Appl. No.: 698,816

[22] Filed: Jun. 23, 1976

Related U.S. Application Data

[62] Division of Ser. No. 428,010, Dec. 26, 1973, abandoned.

[51] Int. Cl.$^2$ .......................... C08K 3/10; C08K 3/04; C08L 83/04
[52] U.S. Cl. .................. 260/42.26; 260/18 S; 260/23 R; 260/825; 260/827; 260/448.2 E; 528/25; 528/33
[58] Field of Search ................. 260/825, 827, 29.1 SB, 260/42.26

[56] References Cited

U.S. PATENT DOCUMENTS

| | | | |
|---|---|---|---|
| 2,958,707 | 11/1960 | Warrick | 260/827 |
| 2,959,569 | 11/1960 | Warrick | 260/827 |
| 2,965,593 | 12/1960 | Dietz | 260/827 |
| 3,070,573 | 12/1962 | Beck | 260/827 |
| 3,428,707 | 2/1969 | Amos et al. | 260/827 |
| 3,436,252 | 4/1969 | Neuroth | 260/827 |
| 3,441,537 | 4/1969 | Lengnick | 260/827 |
| 3,531,424 | 9/1970 | Swanson | 260/827 |
| 3,565,851 | 4/1969 | Neuroth | 260/827 |
| 3,580,971 | 5/1971 | Getson | 260/827 |
| 3,627,836 | 12/1971 | Getson | 260/827 |
| 3,631,087 | 12/1971 | Lewis et al. | 260/827 |
| 3,694,478 | 9/1972 | Adams | 260/827 |

*Primary Examiner*—Harold D. Anderson
*Attorney, Agent, or Firm*—Morgan, Finnegan, Pine, Foley & Lee

[57] ABSTRACT

Polyolefin filled-organopolysiloxane compositions which are stable dispersions comprised of a continuous phase of essentially ungrafted organopolysiloxane and a discontinuous phase of finely divided solid particles of a homopolymer or copolymer prepared from an organic monomer or monomers, said monomer or monomers having aliphatic unsaturation, polymerized in the presence of said organopolysiloxane and their method of preparation are provided. Heat vulcanizable and room temperature vulcanizable organopolysiloxane compositions employing these novel dispersions and cured products thereof are also provided.

8 Claims, No Drawings

POLY (OLEFINIC MONOMER) FILLED-POLY(ORGANOSILOXANE) COMPOSITIONS

This is a division of application Ser. No. 428,010 filed Dec. 26, 1973 now abandoned.

BACKGROUND OF THE INVENTION

This invention relates to organosilicon compositions and more particularly to polyolefin filled-organopolysiloxane compositions.

Heat vulcanizable and room temperature vulcanizable polyorganosiloxane compositions are well known. Generally, these compositions, whether they be of the one-package or two-package type, are composed of an organopolysiloxane base material, crosslinking agents, such as alkyl silicates, alkyltriacyloxysilanes, etc., and curing or crosslinking catalysts, such as organic peroxides, metals salts of carboxylic acids, etc.

It is also well known to incorporate various additives into these organopolysiloxane compositions to improve their properties. Included among these additives are inorganic filler materials, such as silica aerogel, diatomaceous earth, calcium carbonate, iron oxide, etc. The use of filler materials of this nature, however, has not met with complete satisfaction, since often the improvement in the properties of the organopolysiloxane composition realized by their presence may be outweighed by the high cost and formulation problems which they present. This is particularly the case when employing certain silica fillers.

Other methods to improve the properties of organopolysiloxane compositions have also been used in the past. For example, U.S. Pat. No. 2,965,593 to Dietz discloses that a water-repellant polyorganosiloxane composition is provided by dispersing a polyorganosiloxane in a vinyl monomer base and polymerizing the mixture. The resultant material is disclosed therein as a mixture of the polyorganosiloxane in a thermoplastic high polymer matrix.

Further attempts to improve the properties of the organopolysiloxanes are disclosed, for example, in U.S. Pat. Nos. 3,631,087, 3,627,836, 3,580,971, 3,441,537, 3,436,252, 3,070,573, 2,959,569 and 2,958,707. These patents disclose the use of grafted organopolysiloxanes, i.e., organopolysiloxanes which are chemically grafted with polymeric side chains. As discussed, for example, in U.S. Pat. No. 3,627,836, while graft-modified polymers have some desirable properties, they are inadequate in others, and accordingly have not met with total satisfaction.

SUMMARY OF THE INVENTION

Accordingly, it is an object of this invention to provide novel improved organopolysiloxane compositions.

Another object of this invention is to provide improved organopolysiloxane compositions which, without necessarily utilizing conventional inorganic filler materials, provide equal or improved physical properties to products formed therefrom when compared with conventionally filled organopolysiloxane compositions.

Still another object of this invention is to provide improved organopolysiloxane compositions which are essentially free of grafted organopolysiloxane.

These and other objects are accomplished herein by providing organopolysiloxane compositions which are characterized as polyolefin-filled-organopolysiloxane stable dispersions comprised of two phases:

(i) a continuous phase comprising an essentially ungrafted organopolysiloxane fluid and intimately dispersed therein, (ii) a discontinuous phase comprising finely divided solid particles of an ungrafted polymer prepared from an organic monomer having aliphatic unsaturation or mixture of such monomers polymerized in the presence of said orgaopolysiloxane fluid.

DETAILED DESCRIPTION OF THE INVENTION

The polyolefin-filled organopolysiloxane dispersions of the present invention are prepared by the in-situ polymerization of an organic monomer or monomers in an organopolysiloxane fluid material in the presence of a free-radical initiator. Surprisingly, the resulting composition is a stable dispersion wherein a discontinuous phase of discrete finely divided solid particles of a homopolymer or copolymer of the starting organic monomer or monomers are intimately dispersed in a continuous matrix phase of essentially ungrafted and essentially unaltered organopolysiloxane fluid.

The finely divided solid particles of homopolymer or copolymer which are formed in-situ are of a small enough diameter so that they act as reinforcing or semi-reinforcing fillers or, in some cases, extending fillers for the organopolysiloxane matrix material, resulting in an improved stronger silicone elastomer. Generally, the major portion of these solid particles of homopolymer or copolymer have an average diameter of less than about 10–15 microns, with some having a diameter of less than one micron.

While the polyolefin-filled organopolysiloxane dispersions of the present invention may be prepared by simply heating the preformed mixture of components, namely, the organic monomer or monomers, the organopolysiloxane fluid material and the free-radical initiator, other procedures are also contemplated herein. For example, the organic monomer or monomers may be added gradually in increments to a preformed heated mixture of the organopolysiloxane composition and free-radical initiator. Another procedure contemplated herein is gradual incremental addition of a preformed mixture or solution of the organic monomer or monomers and free-radical initiator to the heated organopolysiloxane material. Regardless of which of the above procedures is employed, the organic monomer or monomers are polymerized or copolymerized in-situ, i.e., in the presence of the organopolysiloxane fluid material, and surprisingly, essentially no grafting, condensation, polymerization or other alteration occurs with regard to the organopolysiloxane material.

In all of the hereinabove described processes for preparing the present dispersions, the polymerization catalyst, i.e., the free-radical initiator, may be any of the well-known or conventional free-radical initiators. Among these are included, for example, organic peroxides, such as benzoyl peroxide, 2,4-dichlorobenzoyl peroxide, dialkyl peroxides, like di-tert-butyl peroxide and dicumyl peroxide; hydroperoxide, and decylene hydroperoxide; cyclic peroxides, such as ascaridole and 1,5-dimethylhexane-1,5-peroxide; peresters, such as tert-butylperbenzoate, tert-butyl-peroxyisopropyl carbonate, tert-butylperoctoate and tert-butylperacetate. The well-known are compounds are also useful herein as free-radical initiators. These include, for example, those azo compounds containing tertiary carbon atoms (that is, carbon atoms having no hydrogen attached thereto) attached to each nitrogen atom of the azo linkage. The remaining valences of the tertiary carbon are satisfied by nitrile radicals, carboxyalkyl radicals, cycloalkylene radicals, alkyl radicals and radicals of the formula YOOC in which Y is an alkyl radical. Specific examples of such azo compounds are:

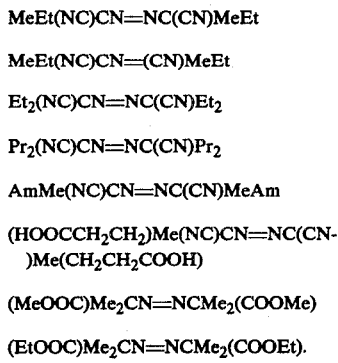

The symbols Me, Et, Pr and Am represent methyl, ethyl, propyl, and amyl, respectively. Preferred free-radical initiators within the scope of the present invention are benzoyl peroxide, tert-butyl peroctoate, and azobis(isobutyronitrile).

The temperature of the in-situ polymerization reaction of the present invention may vary. Generally, however, the temperature should be sufficient to form free radicals at a rate such as to effect the polymerization of the organic monomer or monomers in a reasonable length of time, but insufficient to result in grafting of the organopolysiloxane with polymeric side chains. Specifically, these temperatures are from about 35° C. to about 135° C. and preferably from about 45° C. to about 125° C.

Because of the free radical nature of the polymerization process, it is important that the reaction be maintained in an oxygen-free environment, such as by sweeping the reaction vessel with nitrogen. Furthermore, solvents for dissolving the free-radical initiator and/or organic monomer or monomers such as acetonitrile, chain transfer agents or other conventionally employed polymerization additives may be present during the reaction to modify the reaction and/or to modify the product.

Moreover, the in-situ polymerization process of the present invention can be carried out at subatmospheric, atmospheric or superatmospheric pressure. Preferably, atmospheric pressures are employed. Depending upon the particular conditions employed, the polymerization reaction is generally completed in about 30 minutes to about 10 hours. If it is desired to perform the in-situ polymerization reaction of the present invention by incrementally adding the organic monomer or monomers to the reaction vessel containing the oranopolysiloxane, the portion of increments used and time used may vary. Generally, however, incremental addition is completed in about 10 minutes to about 5 hours.

The organic monomers which are useful to prepare the polyolefin-filled organopolysiloxane dispersions of the present invention may be any olefinic monomer or monomers which have aliphatic unsaturation and which are polymerizable. Examples of suitable monofunctional olefinic compounds are low molecular weight straight chain hydrocarbons, such as ethylene, propylene, butylene and the like; halogenated straight chain hydrocarbons like vinyl halides, such as vinyl chloride; vinyl esters, such as vinyl acetate; vinyl containing aromatics, such as styrene, ring substituted styrenes; other aromatics such as vinylpyridine and vinylnaphthalene; unsaturated acids, such as acrylic acid and derivatives thereof including salts, esters, such as ethyl acrylate, butyl acrylate, methylmethacrylate, amides and unsaturated nitriles, such as acrylonitrile; N-vinyl compounds, such as N-vinylcarbazole, N-vinylpyrrolidone, and N-vinyl caprolactam.

Moreover, disubstituted ethylenes of the type $CH_2=CX_2$ may be used, including vinylidene fluoride, vinylidene chloride, vinylidene cyanide, methacrylic acid, and compounds derived therefrom such as salts, esters and amides as well as methacrolein, methacrylonitrile, and the like.

Disubstituted ethylenes of the type $CHX=CHX$, such as vinylene carbonate and various monomers which polymerize best in the presence of other monomers, e.g., maleic anhydride, esters of maleic acid and fumaric acids, stilbene, indene and coumarone are also useful herein.

Examples of suitable polyfunctional olefinic monomers, i.e., having at least two olefinic linkages, are esters, such as allyl methacrylate, allyl acrylate, diallyl adipate, methallyl acrylate, methallyl methacrylate, vinyl acrylate, vinyl methacrylate; hydrocarbons such as divinylbenzene and vinyl cyclohexene; polyol esters of acrylic and methacrylic acid, e.g., ethylene dimethacrylate, tetramethylene diacrylate, and pentaerythritol tetramethacrylate; and conjugated diolefins such as 1,3-butadiene, isoprene and chloroprene.

Any of these olefinic monomers mentioned hereinabove may be used singly or in combination in the practice of the present invention.

Any of the well-known organopolysiloxane fluid compositions, which are substantially free of aliphatic unsaturation and silanic hydrogen, may be used in the practice of the present invention. The term "substantially free," as employed herein, means that the material may contain traces of the undesirable ingredients which are normally present in commercially available organopolysiloxane materials. For example, organopolysiloxane resins and polymers often contain traces of silicon-bonded hydrogen as an impurity. These trace amounts do not interfere with the reaction of the present invention.

Included among the organopolysiloxane fluid materials useful in the practice of this invention are compounds of the type which have structural units of the formula

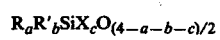

such as disclosed in U.S. Pat. No. 2,958,707, incorporated herein by reference. In these compounds a has a value from 1 to 3, b has a value from 0 to 3, c has a value from 0 to 3, and the sum of a + b + c has a value not greater than 3. R is an alkyl radical, such as methyl, ethyl, propyl, butyl, isobutyl, etc., or aryl, such as phenyl, naphthyl, tolyl and the like, and R' is any monovalent hydrocarbon or halogenated hydrocarbon radical attached to the silicon by a silicon carbon bond, which is free of aliphatic unsaturation, such as alkyl or haloalkyl, including methyl, ethyl, propyl, isopropyl, butyl, chlorobutyl, trifluoropropyl, hexyl, octadecyl; cycloalkyl, or halogenated cycloalkyl, such as cyclohexyl, cyclopentyl, and chlorocyclohexyl; aryl radicals and halogenated aryl radicals such as phenyl, tolyl, chlorophenyl, xylyl, bromophenyl; aralkyl radicals such as benzyl, phenethyl and the like; organofunctional radicals such as carboxyphenyl, gamma-hydroxypropyl, gamma-aminopropyl and any other hydrocarbon radicals having aldehyde, ketone, nitrile, nitro, carboxy, amide, hydrosulfide or other functional groups attached thereto. Preferably R and R' are methyl.

X is an hydrolyzable or condensable group such as hydroxyl, acyloxy, amino, sulfide, halogen or OR''', wherein R''' is a monovalent hydrocarbon radical free of aliphatic unsaturation, such as methyl, ethyl, octadecyl, cyclohexyl, phenyl, tolyl, benzyl, etc.

Among the organopolysiloxane materials useful in the practice of the present invention, as defined by the formula $R_aR'_bSiN_cO_{(4-a-b-c)/2}$, the most preferred are the linear fluid diorganopolysiloxanes having terminal silicon-bonded hydroxyl groups and being substantially free of aliphatic unsaturation and silanic hydrogen such as those disclosed in U.S. Pat. No. 2,843,555 to Berridge, U.S. Pat. No. 3,065,194 to Nitzsche et al, U.S. Pat. No. 3,127,363 to Nitzsche et al, U.S. Pat. No. 2,857,356 to Goodwin and U.S. Pat. No. 2,814,601 to Currie et al, all of which are incorporated herein by reference.

For the purposes of this invention, these linear fluid diorganopolysiloxanes having terminal silicon-bonded hydroxyl groups have a viscosity generally in the range of from about 100 to 10,000,000, preferably from about 500 to 3,000,000 centipoise at 25° C. Most particularly preferred among these are the silanol terminated dimethyl polysiloxanes.

Preparation of these diorganopolysiloxanes may be carried out by any of the well-known procedures. In particular and for example, these polysiloxanes can be produced by following a procedure involving hydrolysis of one or more hydrocarbon substituted dichlorosilanes in which the substituents consist of saturated hydrocarbon groups to produce a crude hydrolyzate containing a mixture of linear and cyclic polysiloxanes. The crude hydrolyzate is then treated with a suitable catalyst such as KOM so that it can be depolymerized to form a mixture of low boiling, low molecular weight cyclic polymers and undesirable materials such as the monofunctional and trifunctional organosiloxanes. The resulting composition is fractionally distiled and there is obtained a pure product containing the low boiling, low molecular weight cyclic polymers free of any significant amount of monofunctional and trifunctional groups.

In order to depolymerize the crude hydrolyzate there is added to said hydrolyzate a strong base such as KOH and the mixture is heated at a temperature in the range of 150° C. to 175° C. under an absolute pressure of 100 mm of Hg. to produce and remove by evaporation a product consisting of low molecular weight cyclic polysiloxanes comprising, for example, about 85 percent of the tetramer and 15 percent of the mixed trimer and pentamer. Among the cyclic polymers that may be so produced are hexamethylcyclotrisiloxane, octamethylcyclotetrasiloxane and decamethylcyclopentasiloxane.

Various pure cyclic polysiloxanes are mixed in the desired proportions to obtain the desired mixture. Then the mixture of the cyclic polysiloxanes is subjected to an equilibration procedure to obtain a linear diorganopolysiloxane. The equilibration is preferably carried out at temperatures of about 125° C. to 150° C. in the presence of a small amount of rearrangement catalyst such as potassium hydroxide, tetrabutyl phosphonium hydroxide, etc. The amount of catalyst used will depend on the extent of the polymerization desired. Generally, 40-50 ppm (parts per million) of the catalyst is sufficient for the polymerization to produce diorganopolysiloxane polymers of a viscosity of $5 \times 10^5$ to $1.0 \times 10^7$ centipoise measured at 25° C. There is also present in the reaction mixture 15-150 ppm (parts per million) of water based on the cyclic polymer so as to supply the hydroxy groups which function as chain-stoppers for the linear diorganopolysiloxane material that is formed. After the equilibration reaction has proceeded for two hours there is reached an equilibration point wherein the mixture contains about 85% linear polymers and the amount of linear polymers being formed from the cyclic polymers is equal to the cyclic polymers being formed from the linear polymers.

When this equilibration point has been reached there is added to the mixture a sufficient amount of an acid donor that will neutralize the KOH catalyst so as to stabilize the polymerization product. Preferably, enough acetic acid is added to the reaction mixture to react with and neutralize the KOH. The cyclicdiorganosiloxanes in the reaction mixture are then distilled off to leave the polydiorganosiloxane polymer which is useful in the present invention. The resulting linear diorganopolysiloxanes are chain-stopped primarily with hydroxy groups and have a viscosity of $5 \times 10^5$ to $1.0 \times 10^7$ centipoise at 25° C.

Then high molecular weight diorganopolysiloxanes having a viscosity of $5 \times 10^5$ centipoise at 25° C. and above can be treated with water and various catalysts to arrive at low molecular weight diorganopolysiloxanes having a viscosity of 100 to 90,000 centipoise at 25° C. This may be accomplished by blowing steam across the surface of the high molecular weight product or through the polymer for a sufficient length of time to obtain the low molecular weight component having the desired silanol content. Thus, it may be desirable to obtain the low molecular weight diorganopolysiloxane from a portion of the high molecular weight diorganopolysiloxanes by the above water treatment which is well known to those skilled in the art so as to reduce the number of diorganosiloxy units from above 5,260 to a value in the neighborhood of 300. The use of steam in this fashion will cause a decrease in the viscosity of the polymer while at the same time the formed linear polysiloxane will have terminal silicon-bonded hydroxy groups.

Alternatively, the low molecular weight diorganopolysiloxanes can be produced from the high molecular weight diorganopolysiloxane by adding water to them and heating the resulting composition at elevated temperatures of 150° C. to 170° C. so as to break up the long chain polymers into smaller chains. The amount of water used will vary depending upon such factors as the molecular weight of the polymer being treated, the time and the temperature at which the mixture of high molecular weight diorganopolysiloxanes are heated and the desired viscosity. These conditions may readily be determined. For example, a high molecular weight diorganopolysiloxane having a viscosity of 2,000,000 centipoise at 25° C. may be heated to 150° C. with 0.5 percent by weight of water and a catalyst for two hours to arrive at a low molecular weight diorganopolysiloxane having a viscosity of 2,000 centipoise. Preferably, the low molecular weight organopolysiloxane is produced so that it has a viscosity of 1,000 to 90,000 centipoise at 25° C.

The amounts of the materials employed in the processes and dispersions of the present invention can vary with wide limits. Thus, for example, the amount of free-radical initiator used in the in-situ polymerization is not critical and in general is from 0.1% to 10% by weight of the total admixture of organic monomer or monomers and organopolysiloxane compound. The amounts of organic monomer or monomers used herein can also vary and are generally within the range of from about 5% to about 70% by weight of the total composition and preferably from about 10% to about 60% by weight of the total dispersion. The amount of organopolysiloxane material employed herein is generally from about 30% to about 95% by weight of the total composition and preferably from about 40% to 90% by weight of the total dispersion.

The polyolefin-filled organopolysiloxane dispersions of the present invention are useful in the manufacture of silicone elastomers, resins and fluids, which are useful for electrical insulation, solvent-resistant hoses, protective coatings, caulking compositions and other uses for which organosilicon compositions of this type are known, such as in coating of paper, textiles and other substrates.

The polyolefin-filled organopolysiloxane dispersions of the present invention are particularly well suited for application in heat and room-temperature vulcanizable compositions.

Thus, heat vulcanizable compositions employing polyolefin-filled poly(diorganosiloxane) gums are within the scope of the present invention. Typical gums may be prepared by condensing the fluid organopolysiloxane of the dispersion with any of the well-known condensing agents, e.g., ferric chloride hexahydrate, phenyl phosphoryl chloride, alkaline condensing agents, such as potassium hydroxide, sodium hydroxide, and the like. These heat vulcanizable polyolefin-filled poly(diorganosiloxane) gums are in turn cured by the application of heat and preferably in the presence of a heat vulcanization catalyst such as an organic peroxide or organic per-esters like benzoyl peroxide, t-butyl peracetate, dicumyl peroxide, di-t-butyl peroxide, 2,4,-dichlorobenzoyl peroxide and the like.

Moreover, the polyolefin-filled organopolysiloxane dispersions of the present invention wherein the organopolysiloxane either contains terminal silicon bonded condensable groups, such as hydroxyl groups, or may be readily modified to contain such condensable groups, are particularly useful in one and two component room temperature vulcanizable compositions and these too are within the scope of the present invention.

For example, a one-package toom temperature vulcanizable system within the scope of the present invention which is vulcanizable upon exposure to moisture is comprised of (1) an essentially water-free polyolefin-filled organopolysiloxane dispersion, as prepared by the present invention, wherein the organopolysiloxane component is an essentially ungrafted linear fluid diorganopolysiloxane substantially free of aliphatic unsaturation and silanic hydrogen, containing terminal silicon bonded hydroxyl groups and having a viscosity of 100 to 10,000,000, preferably 500 to 3,000,000 centipoise at 25° C.; (2) an essentially water-free crosslinking agent selected from the group consisting of (A) an organotriacyloxysilane having the formula $R^3Si(OY)_3$ wherein $R^3$ is selected from the group consisting of a monovalent hydrocarbon radical, a halogenated monovalent hydrocarbon radical, an alkoxysubstituted monovalent hydrocarbon radical, and a cyanoalkyl radical, and Y is selected from the group consisting of a saturated aliphatic monoacyl radical of a carboxylic acid and (B) a monomeric organosilicate having the formula

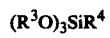
$(R^3O)_3SiR^4$ wherein $R^3$ is as defined above and $R^4$ is selected from the group consisting of alkyl, haloalkyl, arylhaloalkyl, alkenyl, cycloalkyl, cycloalkenyl, cyanoalkyl, alkoxy, and aryloxy; and (C) liquid partial hydrolysis products of the aforementioned organosilicates. These one-component systems, upon exposure to moisture, are cured to elastomers from a few minutes to several hours or days. The curing may be accelerated by the presence therein of a crosslinking catalyst which will be described in more detail hereinbelow with reference to two-component room-temperature vulcanizable compositions.

A preferred two-component, room-temperature vulcanizable composition within the scope of the present invention is comprised of, for example:

(1) a polyolefin-filled poly(organosiloxane) dispersion as prepared by this invention, wherein the poly(organosiloxane) component is an essentially ungrafted linear fluid diorganopolysiloxane having terminal silicon-bonded hydroxyl groups, being substantially free of aliphatic unsaturation and silanic hydrogen and having a viscosity of 100 to 10,000,000, preferably about 500 to 3,000,000 centipoise at 25° C.;

(2) a crosslinking agent selected from the group consisting of (A) a monomeric organosilicate corresponding to the formula $(R^3O)_3SiR^4$ wherein $R^3$ and $R^4$ are as defined above, and (B) a partial liquid hydrolysis product of the aforementioned organosilicate; and (3) a crosslinking catalyst selected from the group consisting of a metal soap, a metal chelate, metal salts of mono- and dicarboxylic acids, metal salts of a thiol, metal salts of a dithiolcarbamic acid, metal oxides, organo-metal compounds, amines, amine salts, imines, organic acids, organic bases and mixtures thereof. The metals which are conventionally part of the aforementioned metal containing crosslinking agents include lead, tin, zirconium, zinc, antimony, iron, cadmium, barium, calcium, titanium, bismuth and manganese. Thus, these crosslinking catalysts employed in the one and two-package room temperature vulcanizable compositions of the present invention may be any of those conventionally employed for that purpose.

Particularly useful crosslinking catalysts which are within the scope of the present invention are the titanium chelate catalysts and the other catalyst systems disclosed in U.S. Pat. Nos. 3,708,467 and 3,689,454 to Smith et al, and U.S. Pat. No. 3,341,486 to Murphy, which are incorporated herein by reference.

These room temperature vulcanizable compositions of the present invention are formulated in the usual manner for preparing siloxane elastomers of this type. In the case of a one-component system, all the ingredients may be mixed prior to use and stored in the absence of moisture. In the case of a two-component system, the crosslinking agent and/or catalyst are stored in a separate package from the polyolefin-filled-organopolysiloxane dispersion. In other words, the polyolefin-filled-organopolysiloxane dispersion, crosslinking agent, and, if desired additional additives, may be compounded in one package and the crosslinking curing catalyst added thereto just prior to use. In another method, the polyolefin-filled-organopolysiloxane dispersion, crosslinking curing catalyst and, if desired, other additives, may be formulated in one package, and the crosslinking agent added thereto just prior to use.

The amounts of crosslinking agent and crosslinking catalysts employed in the vulcanizable compositions of the present invention are not critical and are generally the same amount that is conventionally used in room temperature vulcanizable compositions of this nature. In particular, the crosslinking agents are generally present in amounts varying from about 0.1 to about 15% by weight based on the weight of the organopolysiloxane, while the crosslinking catalysts are generally present in amounts from about 0.1 to 5% by weight based on the weight of the organopolysiloxane.

As a result of the presence of the polyolefin-filled organopolysiloxane dispersions of the present invention, these heat and room-temperature vulcanizable compositions are convertible to cured rubbers having physical strength properties, such as tensile, tear, elongation, etc., which are equivalent to or better than those employing more expensive and difficult to handle conventional inorganic reinforcing fillers. Moreover, the present heat and room-temperature vulcanizable compositions provide different and improved densities and surface appearances in comparison to compositions employing conventional fillers.

If desired, however, the incorporation of conventional fillers into the polyolefin-filled organopolysiloxane dispersions and vulcanizable compositions of this invention is also contemplated herein. These include, for example, fumed silica, high surface area precipitated silicas, silica aerogels, as well as coarser silicas, such as diatomaceous earth, crushed quartz and the like; other fillers include carbon black, metallic oxides, titanium oxide, ferric oxide, zinc oxide; organic fillers having a thixotropic effect, such as lithium stearate and other additives such as pigments, antioxidants, process aids, plasticizers, viscosity control agents, and ultraviolet absorbers also may be employed.

In order that those skilled in the art may better understand how the present invention may be practiced, the following examples are given by way of illustration and not by way of limitation.

EXAMPLE 1

This example illustrates the preparation of a polyvinyl acetate-silanol-terminated poly(dimethylsiloxane) dispersion, containing 40% by weight solid particles of polyvinyl acetate, according to this invention.

180 grams of linear fluid silicon-bonded hydroxy-terminated poly(dimethylsiloxane) having a viscosity of 2,660 centipoise at 25° C. is placed in a one-liter flask equipped with a stirrer, reflux condenser, addition funnel, nitrogen inlet, and oil bath. A solution of 0.45 grams of azobis(isobutyronitrile) and 12 grams of acetonitrile in 120 grams of vinyl acetate monomer is put in the addition funnel. A nitrogen gas flow is allowed to enter the reaction flask and is maintained throughout the reaction. The oil bath is heated to about 95°–100° C. The vinyl acetate solution is added dropwise into the reaction flask containing the silicon-bonded hydroxy-terminated poly(dimethylsiloxane) over a period of about 100 minutes. The reaction mixture becomes white and thicker during the addition. After addition is completed, heat is then applied to the hot mixture for one-half hour to remove unreacted and low boiling materials. 294 grams (98% yield) of a white, viscous field dispersion is obtained.

EXAMPLE 2

This example illustrates the preparation of another polyvinyl acetate-silanol-terminated poly(dimethylsiloxane) dispersion, containing 40% by weight solid particles of polyvinyl acetate, according to this invention.

Using the equipment and reaction conditions of Example 1, a solution of 0.9 grams azobis(isobutyronitrile) in 240 grams of vinyl acetate is added to 360 grams of silicon-bonded hydroxy-terminated-poly(dimethylsiloxane) having a viscosity of 2,660 centipoise at 25° C. A white, viscous fluid (589 grams, 98% yield) having a Brookfield viscosity of 11,900 centipoise at 25° C. is obtained. This white viscous fluid dispersion shows no signs of phase separation after one month.

EXAMPLE 3

This example illustrates the preparation of a polyvinyl acetate-silanol-terminated poly(dimethylsiloxane) dispersion, containing 60% by weight solid particles of polyvinyl acetate, according to this invention.

Using smaller equipment, but similar reaction conditions as in Example 1, a solution of 0.2 grams of azobis-(isobutyronitrile) and 6 grams of acetonitrile in 60 grams vinyl acetate monomer is added to 50 grams of silicon-bonded hydroxy-terminated poly(dimethylsiloxane) having a viscosity of 2,660 centipoise at 25° C. A very viscous fluid (96% yield) is obtained.

EXAMPLE 4

This example illustrates the preparation of a polyvinyl acetate-silanol-terminated poly(dimethylsiloxane) dispersion, containing 12% solid particles of polyvinyl adetate and also containing an additional filler, namely, calcium carbonate, according to this invention.

Using the equipment of Example 1, but without the use of the addition funnel, 211 grams of silicon-bonded hydroxy-terminated poly(dimethylsiloxane) having a viscosity of 2,660 centipoise at 25° C., 29 grams of vinyl acetate, 0.3 grams azobis-(isobutyronitrile) and 72 grams of calcium carbonate filler powder is stirred and heated in 70°–80° oil bath for five hours. A viscous, flowable dispersion is obtained.

EXAMPLE 5

This example illustrates the preparation of a polyvinyl acetate-silanol-terminated poly(dimethylsiloxane) dispersion, containing 40% solid particles of polyvinyl acetate, according to this invention.

Using the equipment and conditions of Example 1, a solution of 0.9 grams azobis(isobutyronitrile) in 2.7 grams of acetonitrile is added to 369 grams of silicon-bonded hydroxy-terminated poly(dimethylsiloxane) having a viscosity of 17,600 centipoise at 25° C. and preheated to 79° C. Then 240 grams of vinyl acetate monomer is added over a period of about 3 hours. A very viscous, white fluid dispersion (573 grams having a viscosity of 73,000 centipoise at 25° C.) is obtained.

EXAMPLE 6

This example illustrates the preparation of a polyvinyl acetate-silanol-terminated-poly(dimethylsiloxane) dispersion, containing 40% solid particles of polyvinyl acetate, according to this invention.

Using the equipment and reaction conditions of Example 1, a solution of 0.1 grams of benzoyl peroxide in 40 grams of vinyl acetate is added to 60 grams of a silicon-bonded, hydroxy-terminated poly(dimethylsiloxane) having a viscosity of 2,660 centipoise at 25° C. A white, viscous dispersion is obtained.

EXAMPLE 7

This example illustrates the preparation of a polystyrene-silanol-terminated poly(dimethylsiloxane) dispersion, containing 30% solid particles of polystyrene, according to thia invention.

Thirty (30) grams of styrene is added slowly to a solution of 1.0 grams of tert-butylperoctoate in 70 grams of a silanol-terminated poly(dimethylsiloxane) having a viscosity of 2660 centipoise at 25° C. in a 90° to 100° C. oil bath. A homogenous, white, pourable dispersion is obtained.

EXAMPLE 8

This example illustrates the preparation of a polystyrene-divinyl benzene-silanol-terminated poly(dimethylsiloxane) dispersion, containing 10% by weight solid particles of a polystyrene/divinyl benzene copolymer, according to this invention.

A solution of 9.4 grams of styrene, 0.6 grams divinylbenzene, 0.2 grams azobis(isobutyronitrile), 0.4 grams acetonitrile in 90 grams of a silicon-bonded hydroxy-terminated poly(dimethylsiloxane) having a viscosity of 2,660 centipoise at 25° C. is heated in a 70°–75° C. oil bath and a nitrogen atmosphere for about 2 hours. A thick, pasty dispersion results which shows no evidence of phase separation.

EXAMPLE 9

This example illustrates the preparation of a polyacrylonitrile-silanol-terminated poly(dimethylsiloxane) dispersion, containing 10% by weight solid particles of poly-acrylonitrile, according to this invention.

A mixture of 10 grams acrylonitrile monomer, 0.2 grams azobis(isobutyronitrile), 0.5 grams acetonitrile and 90 grams of a silicon-bonded hydroxy-terminated poly(dimethylsiloxanes) having a viscosity of 2,660 centipoise at 25° C. is heated in a 70°–75° C. oil bath and a nitrogen atmosphere for about 2 hours. A grease-like dispersion results.

EXAMPLE 10

This example illustrates the preparation of a polymethylmethacrylate)-silanol-terminated poly(dimethylsiloxane) dispersion, containing 10% by weight solid particles of poly(methylmethacrylate), according to this invention.

A mixture of 66.7 grams of methylmethacrylate monomer, 1.3 grams of azobis(isobutyronitrile), 2.5 grams of acetonitrile, and 600 grams of a silicon-bonded hydroxy-terminated poly(dimethylsiloxane) having a viscosity of 2,660 centipoise at 25° C. is heated in a 60°–80° oil bath in a nitrogen atmosphere for about 2½ hours. About 654 grams of a white pasty dispersion is obtained.

EXAMPLE 11

This example illustrates the preparation of a poly(ethyl acrylate)-silanol-terminated poly(dimethylsiloxane) dispersion, containing 25% by weight of solid particles of poly(ethyl acrylate), according to this invention.

A solution of 25 grams of ethyl acrylate, 0.15 grams of azobis(isobutyronitrile), 2.5 grams of acetonitrile, and 75 grams of a silicon-bonded hydroxy-terminated poly(-dimethylsiloxane) having a viscosity of 2,660 centipoise at 25° C. is heated in a 75°–85° C. oil bath in a nitrogen atmosphere for about 3 hours. The flowing, white product is recovered in about 98% yield.

EXAMPLE 12

This example illustrates the preparation of a poly(-butylacrylate) (22%)-polystyrene (28%)-allylmethacrylate (0.05%-silanol-terminated poly(dimethylsiloxane) dispersion, containing solid particles of a polybutylacrylate/polystyrene/allylmethacrylate terpolymer, according to this invention.

A solution of 27 grams of butyl acrylate, 33 grams of styrene, 0.3 grams allyl methacrylate, and 0.3 grams di(tert-butyl) peroxide is added to 60 grams of silicon-bonded hydroxy-terminated poly(dimethylsiloxane) having a viscosity of 3600 centipoise at 25° C. in a 125°–135° C. oil bath in a nitrogen atmosphere for 1½ hours. A very viscous, white dispersion (117.5 grams) in obtained.

EXAMPLE 13

This example illustrates the preparation of a polystyrene-silanol stopped diphenylsiloxane-dimethylsiloxane copolymer dispersion, containing 40% by weight solid particles of polystyrene.

To a solution of 2.4 grams tert-butyl peroctoate in 360 grams of a silanol-stopped 5.3 mole % diphenylsiloxane-dimethylsiloxane copolymer (6900 cp. viscosity) is added 240 grams of styrene. The addition is carried out at 96°–107° C. for 3 hours. A stable dispersion results having a viscosity of 166,000 cps.

EXAMPLE 14

This example illustrates the preparation of a polymethylmethacrylate)-trimethylsiloxy-chain-stopped-diphenyldimethylsiloxane copolymer dispersion, containing 10% by weight solid particles of poly(methylmethacrylate).

A solution of 90 grams of a dimethylsiloxane fluid (chain-stopped with trimethylsiloxy units and containing 12% by weight of copolymerized diphenylsiloxy groups), 10 grams of methylmethacrylate, and 0.2 grams of azobis(isobutyronitrile) is heated at 68° C. for 1.5 hours. A grease-like dispersion of solid particles of poly(methylmethylacrylate in the siloxane fluid is obtained.

EXAMPLE 15

This example illustrates the preparation of a room temperature vulcanizable organopolysiloxane composition and cured product thereof according to this invention.

150 grams of a polyvinyl acetate-silanol terminated poly(dimethylsiloxane) dispersion containing 40% by weight polyvinyl acetate solid particles prepared similarly to that in Example 1 and 15 grams of treated silica (Cabosil) is mixed in a Baker-Perkins mixer. To 70 grams of this mixture is added 0.5 grams ES-40 (partially hydrolyzed ethyl silicate, sold by Union Carbide Corporation) and 0.5 grams Cotin 222 (a methyl tin basic oleate sold by Cosan Chemical Co.). Curing at room temperature results in a rubber product having the properties: Shore A 61 hardness, 600 psi tensile strength, 130% elongation and 39 pi tear.

EXAMPLE 16

This example illustrates a room temperature vulcanizable composition and cured product thereof according to this invention.

A mixture of 70 grams of a polyvinyl acetate-silanol-terminated poly(dimethylsiloxane) dispersion containing 40% by weight polyvinyl acetate solid particles prepared similarly to Example 1, 0.84 grams of ES-40, 4.0 grams of butybenzene phthalate (plasticizer) and 0.5 grams of Cotin 222 is cured in the usual manner and results in a rubber of Shore A 56 hardness, 491 psi tensile strength, 190% elongation and 21 pi tear strength.

EXAMPLE 17

This example illustrates the preparation of a room temperature vulcanizable composition and cured product thereof according to this invention.

Fifteen grams of the dispersion of Example 7, 0.13 grams of ES-40 and 0.1 grams of Cotin 222 are mixed and allowed to cure at room temperature. A hard, flexible rubber is formed within 24 hours.

EXAMPLE 18

This example illustrates the preparation of a heat-vulcanizable composition and cured product thereof according to this invention.

400 parts of the dispersion prepared similarly to Example 7, but containing 160 grams of polystyrene and 240 grams of a silanol-stopped polysiloxane fluid, is mixed with 1.2 parts of stannous octoate in a dough-mixer. The mixture is heated at 140° C. for three hours while flushed with nitrogen. A high viscosity gum-like product results. 100 parts of the gum-like product is mixed with 3 parts of benzoyl peroxide and pressed in a heated mold for 20 minutes. A cured rubber having good properties is formed.

EXAMPLE 19

This example illustrates the preparation of a room-temperature vulcanizable organosiloxane composition and cured product thereof according to this invention.

A mixture of 70 grams of a polyvinyl acetate-silanol-terminated poly(dimethylsiloxane) dispersion containing 40% by weight solid particles of polyvinyl acetate prepared similarly to that in Example 1, 0.55 grams ES-40 0.55 grams of Cotin 222 is cured in a closed mold for 16 hours and exposed for 48 hours. The resulting elastomer has a Shore A 51 hardness, 510 psi tensile strength, 141% elongation, 10 pi tear and a density of 1.06.

EXAMPLE 20

This example illustrates the preparation of a room temperature vulcanizable organosiloxane composition and cured product thereof according to this invention.

A mixture of 70 grams of the dispersion prepared in Example 5 above, 0.84 grams of ES-40 and 0.5 grams of Cotin 222 is cured at room temperature. The product has the following properties: Shore A 45 hardness, 470 psi tensile strength, 170 elongation, 20 pi tear.

EXAMPLE 21

This example illustrates the preparation of a room temperature vulcanizable organopolysiloxane composition and cured product thereof according to this invention.

11 grams of the dispersion prepared in Example 7 is mixed with 3.0 grams of iron oxide filler, 0.25 grams ES-40 and 0.1 gram of a tin catalyst. The mixture is tack-free in less than an hour and cured at room temperature to a soft rubber.

EXAMPLE 22

This example illustrates the preparation of a room-temperature, vulanizable organosiloxane composition and cured product thereof according to this invention.

12 grams of the dispersion prepared in Example 12 above is mixed with 0.1 grams of ES-40 and 0.1 gram Cotin 222 and allowed to cure at room temperature to a soft rubber.

EXAMPLE 23

This example illustrates the preparation of a room-temperature, vulcanizable organosiloxane composition and cured product thereof according to this invention.

A mixture of 13 grams of the dispersion prepared in Example 11, 0.1 grams ES-40, and 0.1 grams of Cotin 222 is allowed to cure at room temperature overnight. A tough resilient rubber is formed.

EXAMPLE 24

This example illustrates an essentially water-free room temperature, vulcanizable organosiloxane composition and cured product thereof according to this invention.

A mixture of 13 grams of the dispersion of Example 21 and 0.3 grams methyltriacetoxysiloxane, which is essentially water-free, is allowed to cure for 24 hours upon exposure to moisture. A strong elastomer is obtained.

EXAMPLE 25

This example illustrates the preparation of a room-temperature, vulcanizable organopolysiloxane composition and cured product thereof according to this invention.

A mixture of 35 grams of the dispersion of Example 13, 0.4 grams ES-40, and 0.75 grams of Cotin 222 is placed in a closed mold for 16 hours.

A cured rubber results having the properties 45 Shore A, 680 psi tensile strength, 120% elongation and 17 psi tear.

Obviously, other modifications and variations of the present invention are possible in the light of the above teachings. It is, therefore, to be understood that changes may be made in the particular embodiments of this invention which are within the full intended scope of the invention as defined by the appended claims.

What is claimed and desired to be secured by Letters Patent is:

1. A room temperature vulcanizable composition consisting essentially of:
   (A) a stable dispersion consisting essentially of two phases:
   (i) a continuous phase consisting essentially of ungrafted linear fluid poly(diorganosiloxane) containing terminal silicon-bonded hydroxy groups which is substantially free of aliphatic unsaturation and silanic hydrogen and having a viscosity of 100 to 10,000,000 centipoise at 25° C. and intimately dispersed therein
   (ii) a discontinuous phase consisting essentially of finely divided solid particles of an ungrafted polymer prepared from an organic monomer having aliphatic unsaturation or a mixture of such monomers polymerized in the presence of said linear fluid poly(diorganosiloxane);

(B) a crosslinking agent selected from the group consisting of (1) a monomeric organosilicate corresponding to the formula:

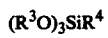

wherein $R^3$ is a radical selected from the group consisting of a monovalent hydrocarbon radical, a halogenated monovalent hydrocarbon radical and a cyanoalkyl radical, and $R^4$ is selected from the group consisting of alkyl, haloalkyl, arylhaloalkyl, alkenyl, cycloalkyl, cycloalkenyl, cyanoalkyl, alkoxy and aryloxy and (2) a partial liquid hydrolysis product of the aforementioned organo silicates; and (C) a crosslinking catalyst.

2. The composition of claim 1 wherein said linear fluid poly(diorganosiloxane) is a poly(dimethylsiloxane) containing terminal silicon-bonded hydroxy groups.

3. The composition of claim 1 wherein said cross-linking catalyst is selected from the group consisting of metal soaps, metal chelates, metal salts of mono- and dicarboxylic acids, metal salts of a thiol, metal salts of a dithiolcarbamic acid, metal oxides, organo-metal compounds, amines, amine salts, imines, organic acids, organic bases, and mixtures thereof.

4. The composition of claim 3 wherein the metal containing cross-linking catalyst contain a metal selected from the group consisting of lead, tin, zinc, zirconium, antimony, iron, cadmium, barium, calcium, titanium, bismuth and manganese.

5. The composition of claim 4 wherein the cross-linking catalyst is a metal salt of monocarboxylic or dicarboxylic acid.

6. The composition of claim 2 which includes an inorganic filler material.

7. The composition of claim 3 wherein said inorganic filler material is selected from the group consisting of silica, fumed silica, high surface area precipitated silica, silica aerogel, diatomaceous earth, crushed quartz, carbon black, titanium oxide, ferric oxide, zinc oxide, calcium carbonate, and mixtures thereof.

8. The cured product of claim 1.

* * * * *